(12) United States Patent
Haigh

(10) Patent No.: US 12,001,027 B2
(45) Date of Patent: Jun. 4, 2024

(54) APPARATUS FOR EMITTING OR DETECTING TWO BEAMS OF LIGHT ALONG A COMMON AXIS

(71) Applicant: Colordyne Limited, London (GB)

(72) Inventor: Neil Richard Haigh, Preston (GB)

(73) Assignee: COLORDYNE LIMITED, London (GB)

( * ) Notice: Subject to any disclaimer, the term of this patent is extended or adjusted under 35 U.S.C. 154(b) by 460 days.

(21) Appl. No.: 17/433,085

(22) PCT Filed: Feb. 24, 2020

(86) PCT No.: PCT/GB2020/050426
§ 371 (c)(1),
(2) Date: Aug. 23, 2021

(87) PCT Pub. No.: WO2020/174222
PCT Pub. Date: Sep. 3, 2020

(65) Prior Publication Data
US 2022/0146843 A1    May 12, 2022

(30) Foreign Application Priority Data
Feb. 27, 2019  (GB) .................................. 1902667

(51) Int. Cl.
*G02B 27/10* (2006.01)
*G02B 17/08* (2006.01)
*G02B 27/14* (2006.01)

(52) U.S. Cl.
CPC ..... *G02B 27/1066* (2013.01); *G02B 17/0856* (2013.01); *G02B 27/14* (2013.01)

(58) Field of Classification Search
CPC . G02B 27/1066; G02B 27/14; G02B 17/0856
USPC ........................................................ 359/210.2
See application file for complete search history.

(56) References Cited

U.S. PATENT DOCUMENTS

| | | | |
|---|---|---|---|
| 4,290,667 A | 9/1981 | Chown | |
| 5,260,829 A | 11/1993 | Cantaboube | |
| 6,285,508 B1* | 9/2001 | Ai ..................... | G02B 27/1086 359/664 |
| 2004/0141698 A1 | 7/2004 | Chen | |

(Continued)

FOREIGN PATENT DOCUMENTS

| | | |
|---|---|---|
| JP | 59119312 A | 7/1984 |
| JP | 2005181000 A | 7/2005 |

OTHER PUBLICATIONS

British Search Report for corresponding application GB1902667.3; Report dated Aug. 14, 2019.

(Continued)

*Primary Examiner* — Wyatt A Stoffa
*Assistant Examiner* — Mitchell T Oestreich
(74) *Attorney, Agent, or Firm* — CANTOR COLBURN LLP

(57) ABSTRACT

A light emitting or detecting apparatus comprises a catadioptric lens body including a spherical lens containing an integral reflector and defining first and second conjugate focal planes relative to a subject plane. A pair of light emitters or a pair of Sight detectors are arranged respectively at the first and second conjugate focal planes to detect or emit light travelling along a common axis to or from the subject plane.

19 Claims, 13 Drawing Sheets

(56) References Cited

U.S. PATENT DOCUMENTS

2009/0190229 A1 7/2009 Videen
2009/0190230 A1 7/2009 Videen

OTHER PUBLICATIONS

International Search Report for corresponding application PCT/GB2020/050426 filed Feb. 24, 2020; Report dated May 4, 2020.
Written Opinion of the International Searching Authority for corresponding application PCT/GB2020/050426 filed Feb. 24, 2020; Report dated May 4, 2020.

* cited by examiner

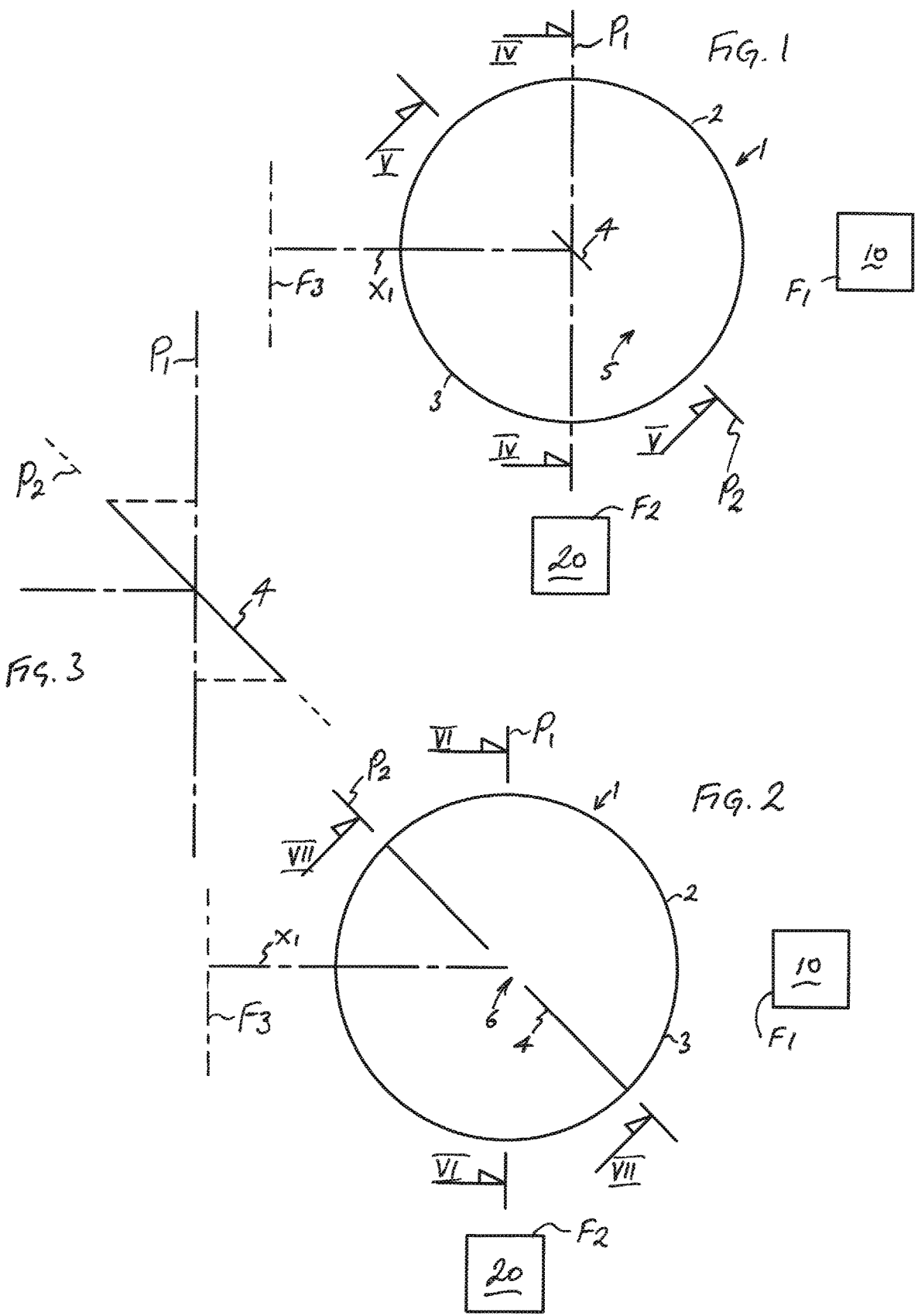

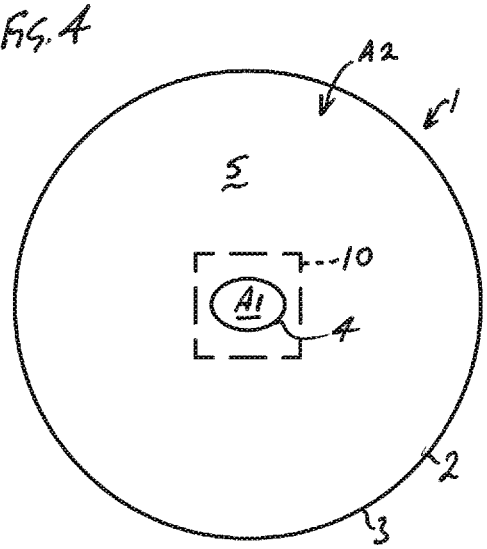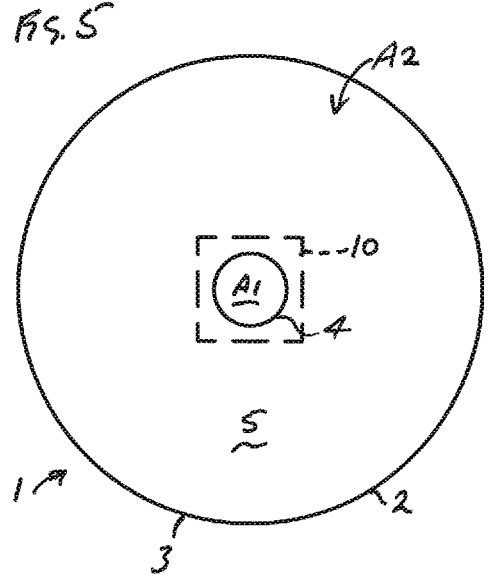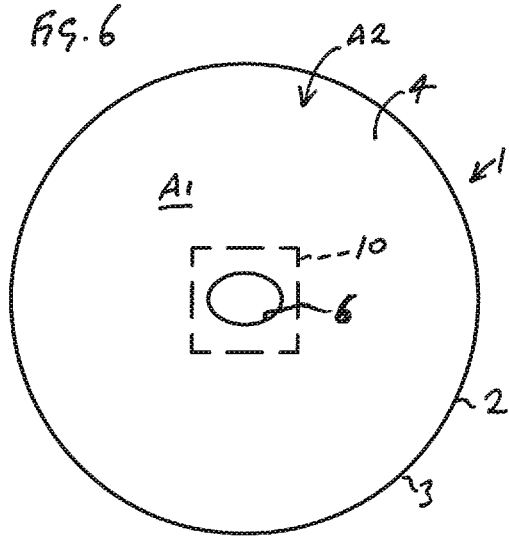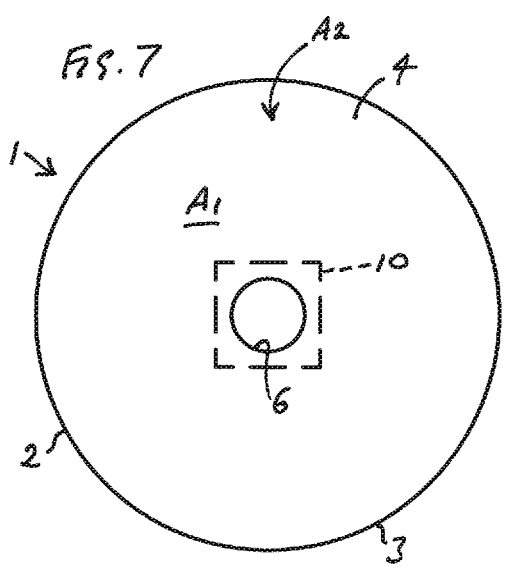

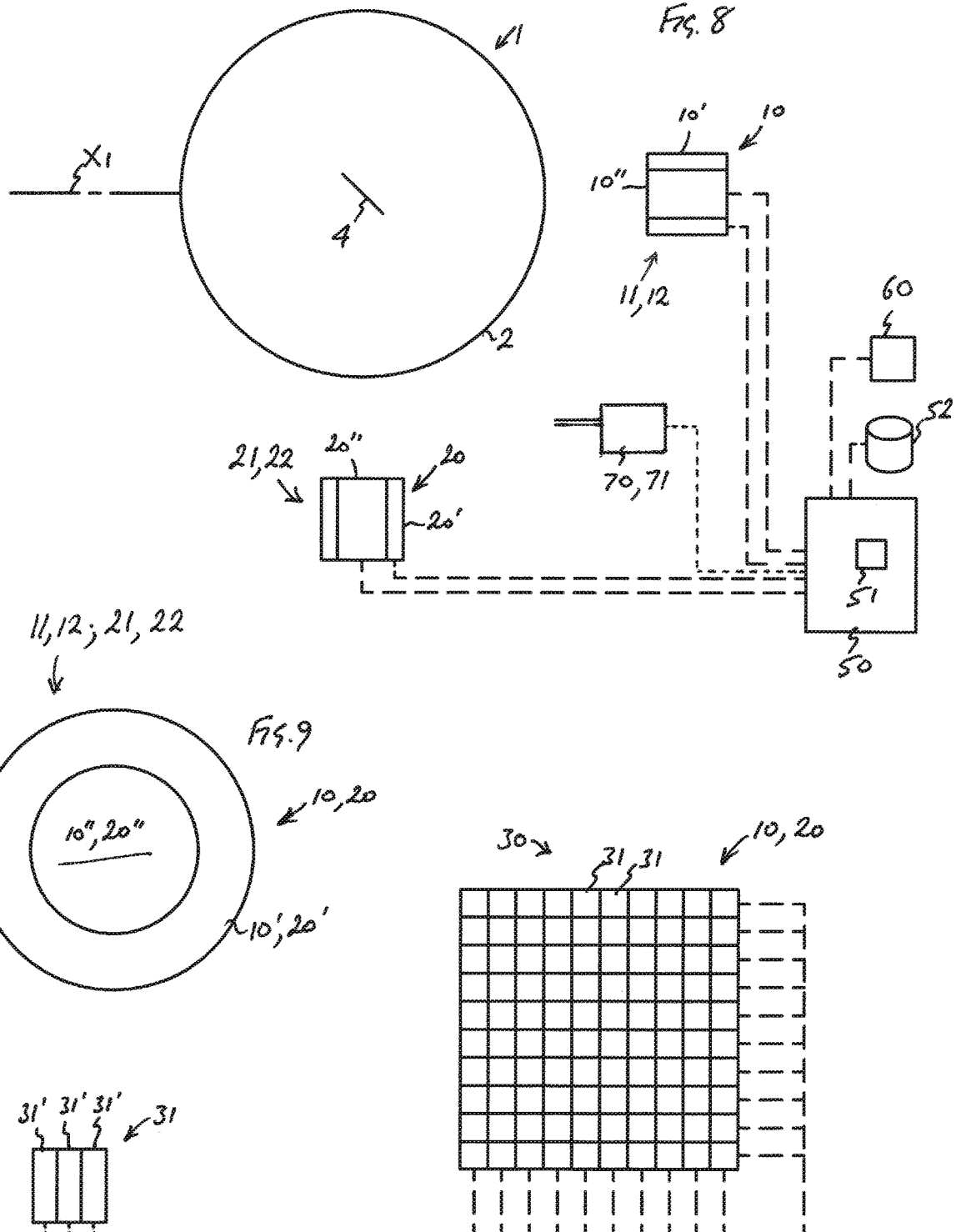

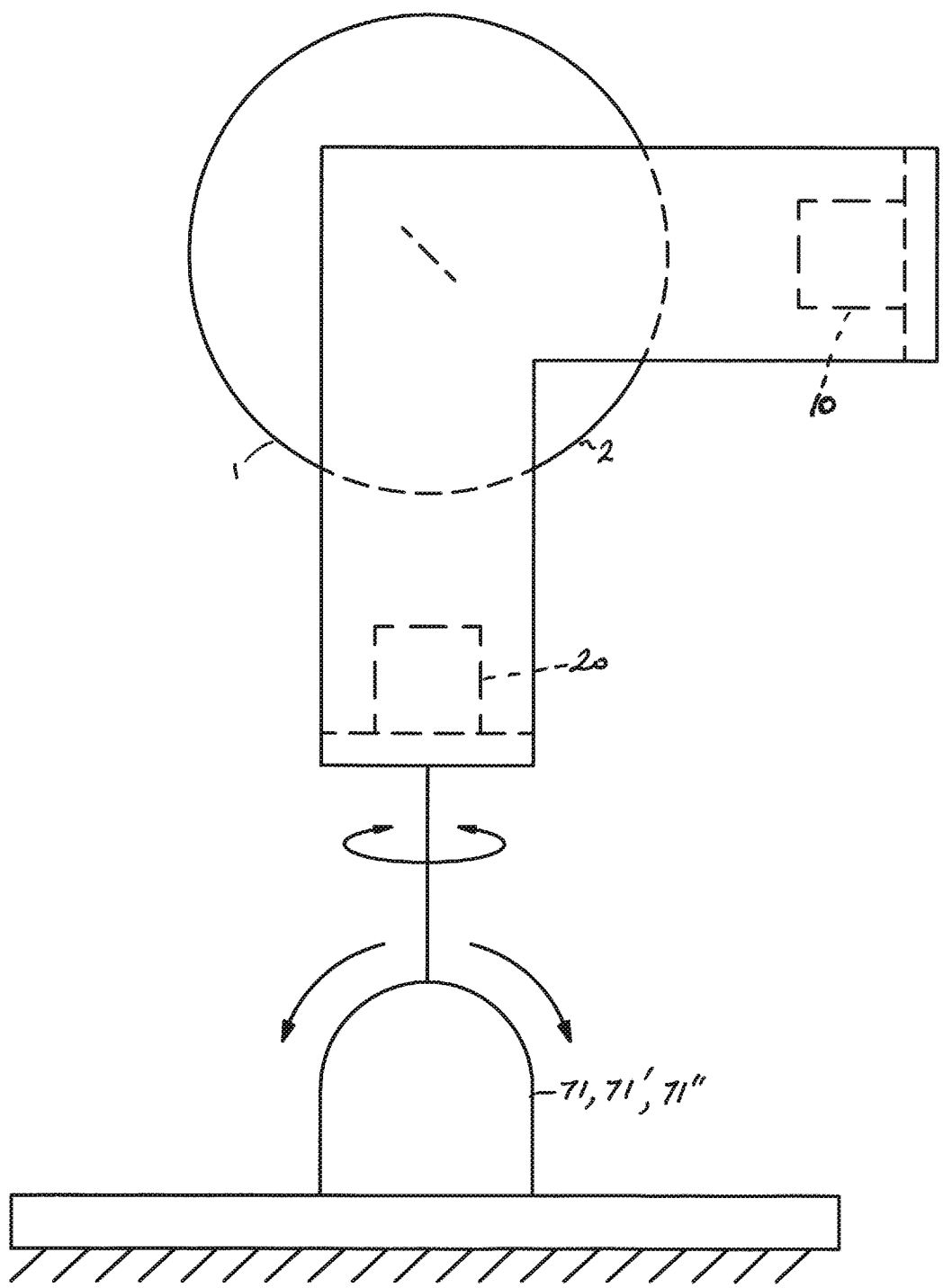

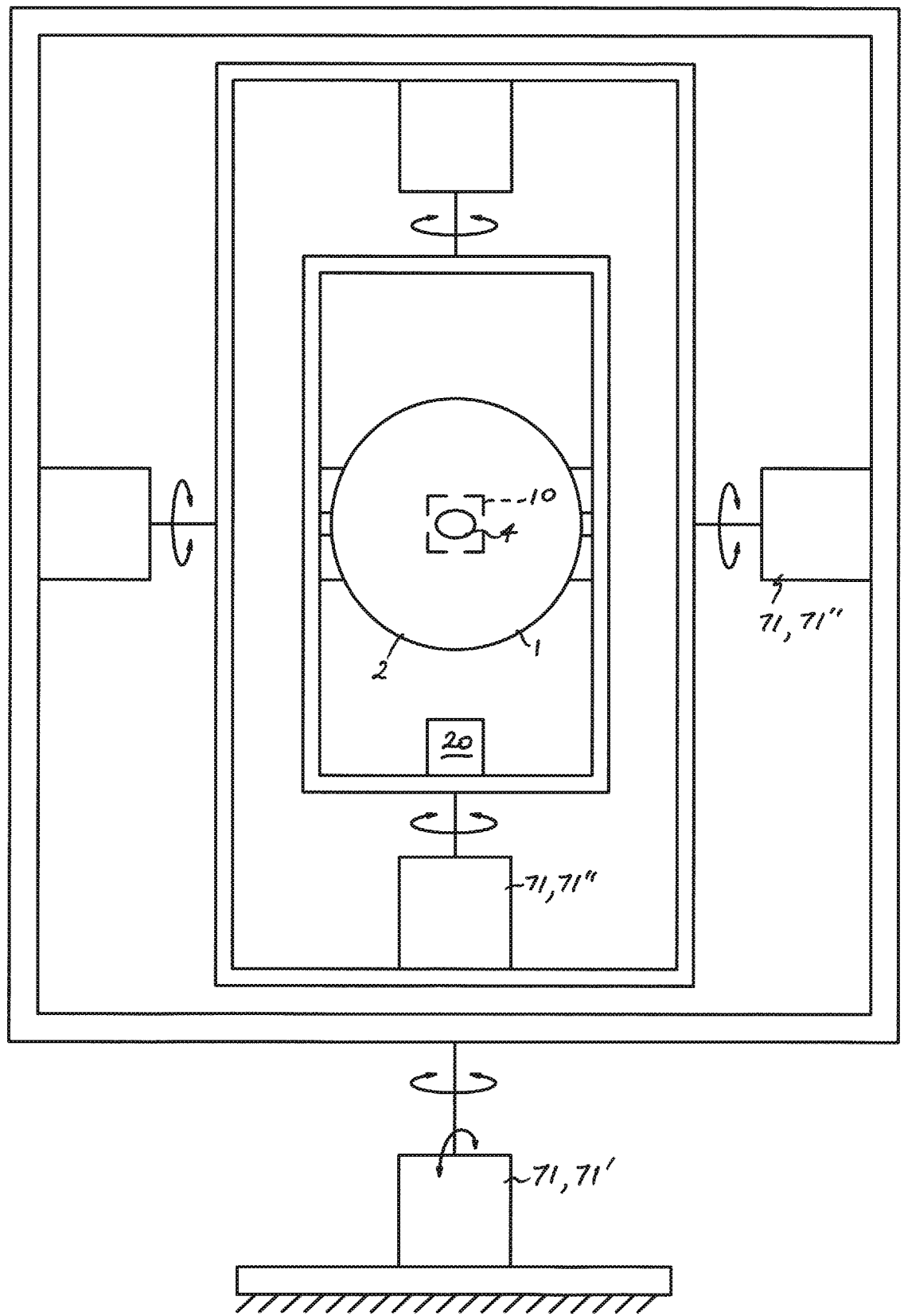

APPARATUS FOR EMITTING OR DETECTING TWO BEAMS OF LIGHT ALONG A COMMON AXIS

TECHNICAL FIELD

This disclosure relates to optical systems in which two beams of light are transmitted along a common axis.

BACKGROUND

It is known to separately detect two components of a beam of light travelling along an axis by means of a beam splitter, formed for example as an interface between two prisms, which directs the two beam components to two separate detectors. Similarly, two beams of light produced by two light emitters may be combined to form a single beam travelling along a common axis.

In practice, beam splitters can have limited optical efficiency.

BRIEF SUMMARY

The disclosure provides an alternative way of emitting or detecting two beams of light, or two components of a beam of light, travelling along a single axis.

In accordance with the present disclosure there is provided an apparatus for emitting or detecting light travelling along a first axis, including a lens body, and first and second light handling units.

The lens body includes a ball and a reflector contained within the ball. The ball is transparent and has a surface, the surface defining a total surface area of the ball and having substantially spherical curvature over substantially all of the total surface area.

A reflector plane is defined as a nominal plane passing centrally through the ball and normal to the first axis. When the reflector is considered as projected along the first axis onto the reflector plane, the reflector occupies less than all of an area of the reflector plane bounded by the surface.

The apparatus is arranged to define first and second conjugate focal planes relative to a subject plane, and to transmit light entering or leaving the lens body along the first axis and travelling between the lens body and the subject plane, such that: a first portion of the light travels through the ball and past the reflector between the subject plane and the first light handling unit located at the first conjugate focal plane, and a second portion of the light travels through the ball and is reflected from the reflector between the subject plane and the second light handling unit located at the second conjugate focal plane.

In a first aspect of the disclosure, the first light handling unit includes a first light emitter, and the second light handling unit includes a second light emitter.

In a second aspect of the disclosure, the first light handling unit includes a first light detector, and the second light handling unit includes a second light detector.

BRIEF DESCRIPTION OF THE DRAWINGS

Further features and advantages of the disclosure will be appreciated from the various illustrative embodiments which will now be described, purely by way of example and without limitation to the scope of the claims, and with reference to the accompanying drawings, in which:

FIG. 1 shows an apparatus in accordance with an embodiment of the disclosure in a first configuration, in which h the lens body transmits light past the reflector to or from the first light handling unit;

FIG. 2 shows the apparatus in a second, alternative configuration wherein the lens body transmits light through an aperture in the reflector to or from the first light handling unit;

FIG. 3 shows how the reflector is projected along the first axis onto the nominal reflector plane P1 to determine its projected area in the reflector plane;

FIG. 4 shows the apparatus in the first configuration, looking in the direction of the arrows IV-IV along the first axis X1 towards the reflector plane P1 as shown in FIG. 1;

FIG. 5 shows the apparatus in the first configuration, looking in the direction of the arrows V-V towards the plane P2 containing the surface of the reflector;

FIG. 6 shows the apparatus in the second configuration, looking in the direction of the arrows VI-VI along the first axis X1 towards the reflector plane P1 as shown in FIG. 2;

FIG. 7 shows the apparatus in the second configuration, looking in the direction of the arrows VII-VII towards the plane P2 containing the surface of the reflector;

FIG. 8 shows the apparatus in an embodiment including a controller and a user interface;

FIG. 9 shows one of the light handling units of the embodiment of FIG. 8;

FIG. 10 shows one of the light handling units comprising an array;

FIG. 11 shows one element of the array comprising a sub-array;

FIG. 12 illustrates one mounting configuration of the apparatus, referred to hereinafter as "mounting configuration A1", in which both light handling units are arranged in fixed relation to the lens body;

FIGS. 13 and 14 illustrate another mounting configuration of the apparatus, referred to hereinafter as "mounting configuration A2", in which both light handling units are arranged in fixed relation to the lens body;

FIGS. 19-22 illustrate another embodiment in which the first and second light handling units include first and second light detectors configured to detect light at different frequencies, wherein:

FIG. 19 shows the lens body in a default position;

FIG. 20 shows the lens body rotated to scan a region of the subject plane;

FIG. 21 shows how the user defines on a display a region of a first image generated by the first light detector and corresponding to the region of the subject plane to be scanned; and FIG. 22 shows how an image of the scanned region is generated from the second light detector and superimposed on the first image.

DETAILED DESCRIPTION

Figure 14:
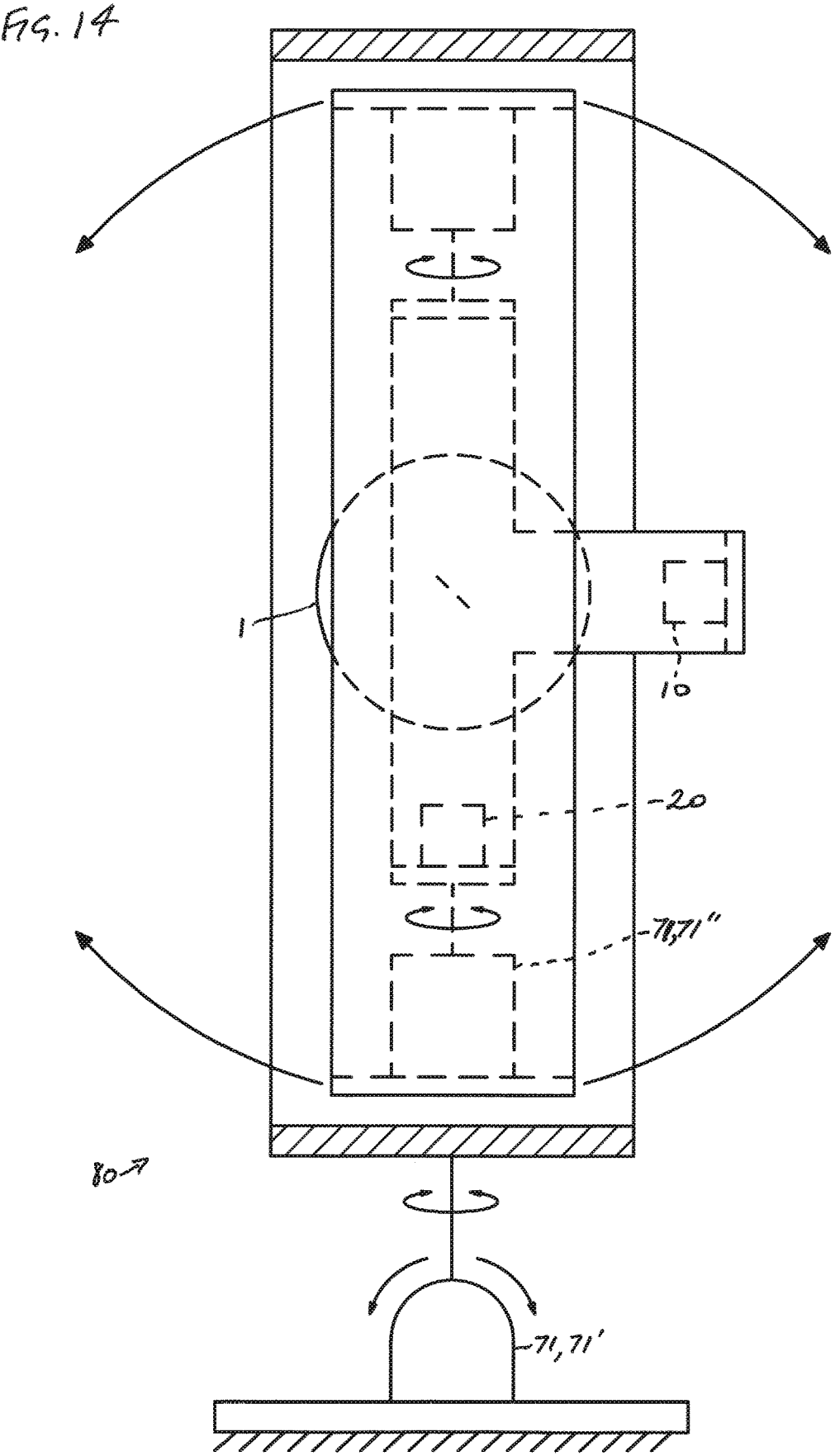

Reference numerals occurring in more than one of the figures indicate the same or corresponding elements in each of them.

In this specification, light means electromagnetic radiation of any frequency, whether visible or non-visible, that can be focused by the lens body.

The reflector plane is a nominal flat plane.

A beam director means any element of the apparatus capable of moving or directing a beam of the light or the respective, first or second portion of the light with respect to the subject plane or the first or second light handling unit. A beam director may include an actuator (which can be any mechanism for moving a mechanical part, for example, a motorized drive unit) which is arranged to rotate or otherwise move an optical element of the apparatus. The optical element may be the lens body, the first or second light handling unit, or a first, second or third optical element (for example, a reflector, a lens or a refractor) located in the path of the light respectively between the lens body and the first light handling unit, between the lens body and the second light handling unit, or on the first axis between the lens body and the subject plane, or any combination of two or more of those components.

A scanning light detector means a detector for detecting light from a small region of the subject plane, generally referred to herein as a point or pixel, without differentiating between different spatial parts of the small region. Thus, the signal generated from a scanning light detector may define one or more parameters, such as illuminance, of a single point or pixel of an image generated from the signal. By scanning the target point over the subject plane many such points or pixels can be arranged in a spatial array to form the image.

An image may be any representation or data set that is displayed or is capable of being displayed as a spatial array. For example, light received from the subject plane may be displayed as an image comprising a two-dimensional or three-dimensional or quasi-three-dimensional visible picture of a target object or region in the subject plane, and an image may be projected onto the subject plane to form a visible projection of an object in an object plane located at the respective, first or second conjugate focal plane, wherein the object may be a static picture or slide, a drawing, or a moving image.

An optical element means any element of the optical system that reflects or refracts or otherwise transmits the light, including for example the lens body and any additional reflectors or lenses or waveguide elements.

Referring to FIGS. 1 and 2, the apparatus includes a lens body 1, a first light handling unit 10, and a second light handling unit 20, and is arranged to define first and second conjugate focal planes F1, F2 relative to a subject plane F3.

The first light handling unit 10 is located at the first conjugate focal plane F1, and the second light handling unit 20 is located at the second conjugate focal plane F2.

In this specification, the subject plane means a nominal plane, which may lie at a finite distance or an infinite distance or within a range of distance from the lens body, at which distance or within which range of distance the light received from or projected onto a subject surface or body can be focused to project an image of the subject onto the conjugate focal planes, or to project an image from the conjugate focal planes onto the subject plane. Said distance or range of distance is defined by the conjugate focal distance of the subject plane relative to the first and second conjugate focal planes. References to scanning a region of the subject plane or moving the target point or the light emitted from the lens body across the subject plane should be construed accordingly to include scanning or moving the light across a subject or target surface or body, which may be flat or may have depth in the direction of the light beam depending on the conjugate focal distance.

The first and second conjugate focal planes are defined by their optical relationship to the subject plane as defined by the optical characteristics of the lens body and any other optical elements of the system, and not by their straight line distance from the lens body. So for example, the straight line distance between the lens body and the first or second light handling unit located at the corresponding conjugate focal plane may be reduced or extended by another optical element such as a reflector or refractor or focusing arrangement interposed between the lens body and the first or second light handling unit.

The lens body 1 includes a ball 2 and a reflector 4 contained within the ball 2. The ball 2 is transparent and has a surface 3, the surface 3 defining a total surface area of the ball 2 and having substantially spherical curvature over substantially all of the total surface area.

The lens body and the first and second light handling units form a catadioptric conjugate imaging system, which is to say, an optical system in which a reflector and a lens are combined to define a focal relationship between the subject plane F3 and the first and second conjugate focal planes F1, F2.

Those skilled in the art will appreciate that a catadioptric system may be arranged so that the field of view remains entirely visible as light is refracted past (around or through) the reflector, despite the fact that the reflector is positioned on the axis of the optical system. This may be achieved by positioning the reflector at a position other than a "field stop" location, for example, at an "aperture stop" location, so that the normal rules of conjugate imaging apply.

The transparent ball functions as a biconvex lens or "thick" lens. The curvature of the surface of the ball and its refractive index effectively define the focal length of the 'thick' lens and thereby its conjugate imaging properties. Typically for example, for an acrylic ball of diameter 70 mm and refractive index n=1.5, the back vertex focal length of the lens is of the order of 17 mm or so. Those skilled in the art will readily select the materials and dimensional parameters to suit applications involving near or distant target planes.

In this specification, a ball as included in the lens body means a spherical or spheroidal or aspherical body that functions as a lens with conjugate imaging properties. That is to say, the optical characteristics of the ball including its surface (which may be polished) are suitable for focusing the light transmitted by the ball between the conjugate focal planes F1, F2 and the subject plane F3. For example, if the light travels from the subject plane F3 to the conjugate focal planes F1, F2 then the ball 2 will focus the light to form an image at the conjugal focal planes F1, F2.

Spherical curvature means the curvature of a sphere.

Substantially spherical curvature means a spherical curvature that is modified to a degree that allows the ball 2 to function as a lens with conjugate imaging properties, and in particular, to a degree necessary to reduce spherical aberration. Thus, the ball 2 may be a sphere or may be a spheroid or asphere, for example, an oblate or prolate sphere, with its surface curvature selected to minimize spherical aberration.

The ball may be made from a solid material such as glass or a transparent plastic such as acrylic.

In alternative embodiments the ball may comprise a transparent shell containing a transparent liquid or gel.

In order to reduce spherical aberration the ball may comprise a plurality of concentric spherical shells, each shell having a different refractive index from the other shells. The refractive index of the shells relative to each other may vary progressively inwardly from the outer surface 3 of the ball towards its center. For example, the refractive index of each shell (other than the outermost shell) may be greater than that of the immediately radially outwardly adjacent shell, which is to say, the refractive index of the shells increases progressively inwardly towards the center of the ball 2.

The reflector may be for example, a mirrored solid body, a mirrored internal surface of the ball, or a reflective surface of an optical discontinuity such as a void space within the ball.

The reflector may be arranged in fixed relation to the ball, as shown in the illustrated embodiments. In alternative embodiments (not shown), the reflector may be rotatable or otherwise movable within the ball and relative to the ball.

Figure 17:
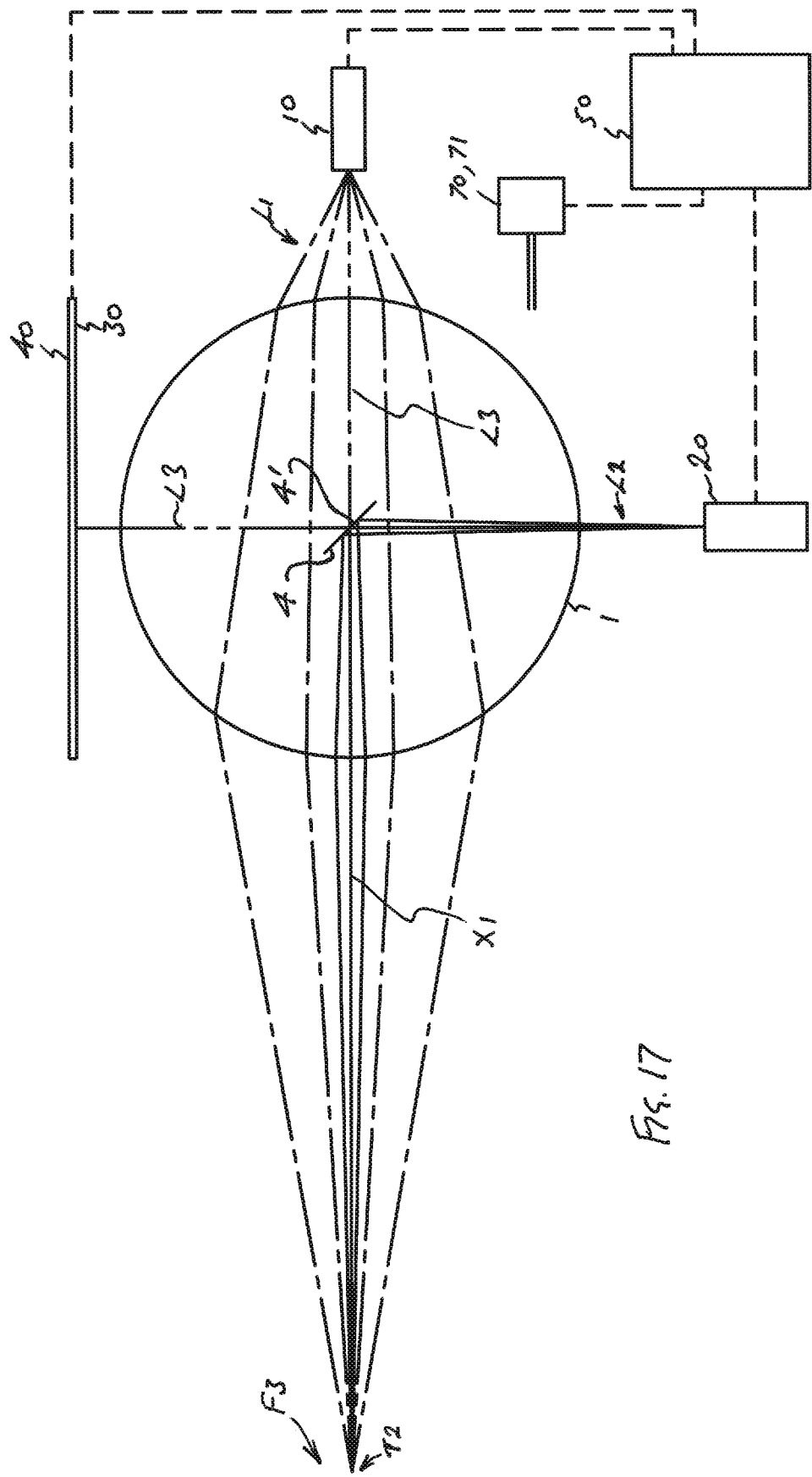
FIG. 17 illustrates another embodiment in which each light handling unit includes a laser light emitter.
Figure 18:
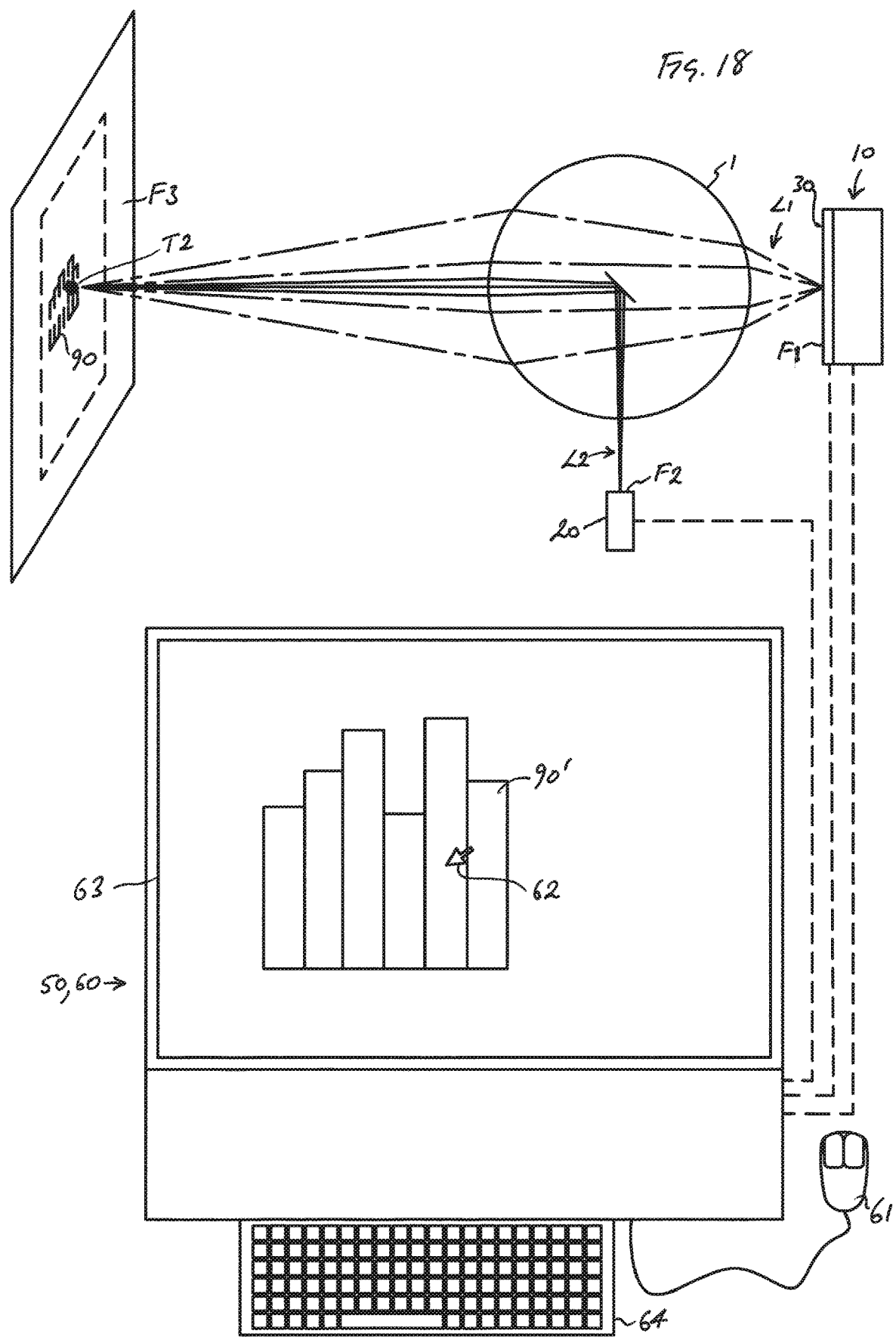
FIG. 18 illustrates another embodiment in which the first light handling unit includes a projector and the second light handling unit includes a laser light emitter configured as a laser pointer.
Figure 19:
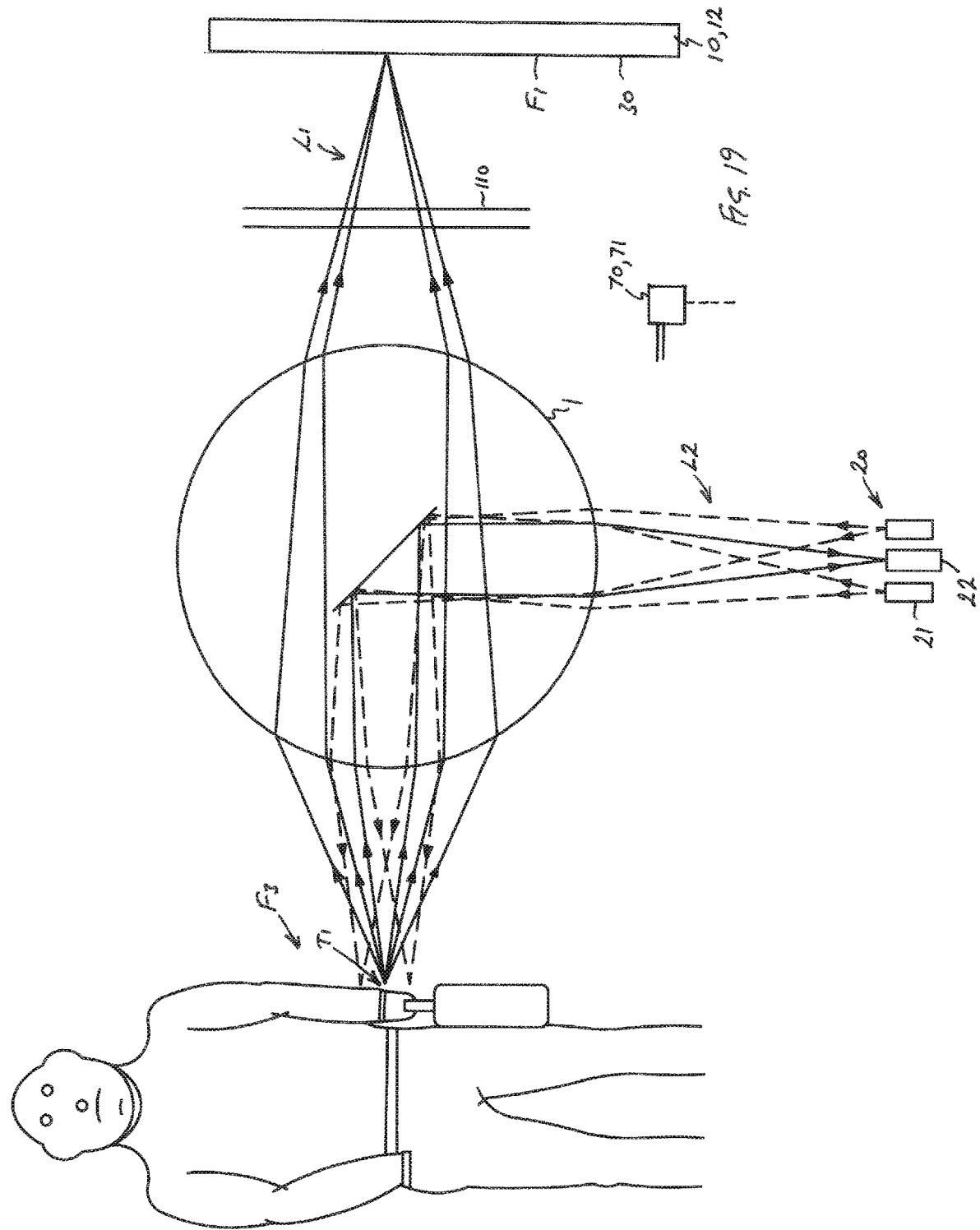
Figure 20:
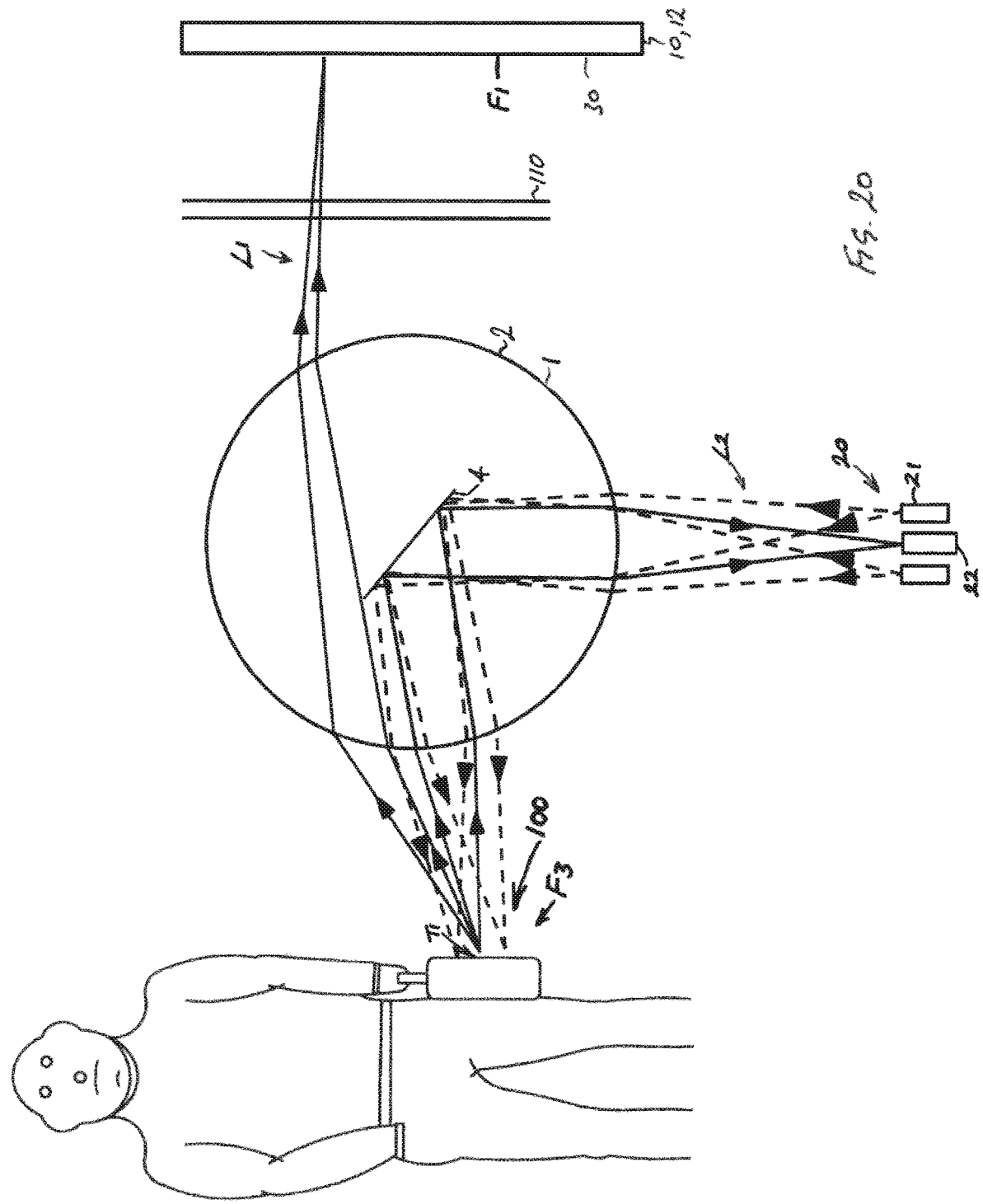

The apparatus is arranged to emit or detect light travelling along a first axis X1, which may be defined in a reference position, which may be a default or rest position of the lens body as shown for example in FIGS. 1 and 2, and in each of FIGS. 17, 18 and 19. It will be understood that where the lens body or reflector is movable relative to the first and/or second light handling unit, the two light handling units may emit or receive light along different axes depending on the relative position of the respective components, but will emit or receive light along the common, first axis X1 in their reference position. Thus, embodiments may allow one beam axis to move angularly around the other to scan a region of the subject plane, when the two beams are directed to or from the two respective light handling units, as further explained below.

The first axis X1 may pass through the geometric center of the ball, which may be the center of rotation about which the lens body or reflector rotates, as shown in each of the illustrated embodiments.

Referring also to FIG. 3, a reflector plane P1 is defined as a nominal plane passing centrally through the ball 2 and normal to the first axis X1. The reflector 4 may be considered as projected along the first axis X1 onto the reflector plane P1, as shown in FIG. 3. The area A1 of the reflector plane P1 occupied by the reflector 4 when so projected is less than all of the area A2 of the reflector plane P1 bounded by the surface 3 of the ball 2, as can be seen in each of FIGS. 4-7.

The reflector plane P1 passes centrally through the ball 2, so that where the ball 2 is spherical (as shown), the reflector plane P1 will be an equatorial plane bisecting the ball 2.

The reflector is preferably 100% reflective, but could be less than 100% reflective.

As illustrated, the reflector 4 may be located centrally within the ball 2, and may be circular. The reflector may be flat or curved, and may lie in (or, if curved, may define a central axis of symmetry normal to) a plane P2 which intersects the nominal reflector plane P1.

In all of the illustrated embodiments, the reflector 4 is flat and circular and lies in a plane P2 which intersects the nominal reflector plane P1.

Referring to FIGS. 1, 4 and 5, in a first configuration (and as also illustrated in all of the embodiments apart from FIGS. 2, 6 and 7), when the reflector 4 is considered as projected along the first axis X1 onto the reflector plane P1, the reflector 4 is spaced apart from the surface 3 of the ball 2 by a gap 5, the gap 5 surrounding the reflector 4.

Referring to FIGS. 2, 6 and 7, in the a second configuration the reflector surrounds an aperture 6, the aperture passing through the reflector. The first axis X1 may pass centrally through the aperture, as shown. (In FIG. 2 the reflector is shown edge-on and schematically, and for clarity, the portion of the reflector lying in front and behind the aperture 6 from the direction of view is not shown, but it will be understood that the reflector is annular, as shown in FIGS. 6 and 7.)

Referring also to FIGS. 17-20, the apparatus is arranged to transmit light entering or leaving the lens body 1 along the first axis X1 and travelling between the lens body 1 and the subject plane F3, such that a first portion L1 of the light travels through the ball 2 and past the reflector 4 between the subject plane F3 and the first light handling unit 10 (located at the first conjugate focal plane F1), and a second portion L2 of the light travels through the ball 2 and is reflected from the reflector 4 between the subject plane F3 and the second light handling unit 20 (located at the second conjugate focal plane F2).

In the first configuration (FIGS. 1, 4 and 5) the first portion of the light L1 travels around the reflector 4 through the gap 5, while in the second configuration (FIGS. 2, 6 and 7), the first portion of the light L1 travels through the aperture 6.

The first or second configuration may be adopted in any embodiment of the disclosure. However, one configuration may be preferred for certain embodiments. For example, where the second light handling unit includes a high energy laser light emitter that emits a narrow beam, the narrow beam may be reflected from a central reflector according to the first configuration.

Advantageously, the arrangement of the reflector in the ball enables two beam paths to be combined together, substantially without any loss from the reflected beam to or from the second light handling unit, while the beam travelling to or from the first light handling unit remains substantially unobstructed with very little loss.

The first portion L1 of the light may travel between the lens body 1 and the first light handling unit 10, either directly or via additional optical elements.

The second portion L2 of the light may travel between the lens body 1 and the second light handling unit 20, either directly or via additional optical elements.

The first and second portions L1, L2 of the light may travel between the lens body 1 and the subject plane F3, either directly or via additional optical elements.

Additional optical elements 110 may be provided to adjust focus and/or to correct spherical aberration or for other purposes. The or each additional optical element may include, for example, a focusing element, e.g. a distance adjustment mechanism or an adjustable lens, e.g. a liquid or tuneable lens, or a distortion or correction plate, a lens or a reflector or a refractor or a filter, or an object display for displaying an image or graphic object to be projected onto the subject plane.

In embodiments according to a first aspect of the disclosure, the first light handling unit 10 includes a first light emitter 11, and the second light handling unit includes a second light emitter 21.

In embodiments according to a second aspect of the disclosure, the first light handling unit 10 includes a first light detector 12, and the second light handling unit includes a second light detector 22.

In either aspect of the disclosure, each of the light handling units may comprise two or more functional units, which may be light emitters or light detectors. For example, the first light handling unit 10 may include both a first light emitter 11 and a first light detector 12, and/or the second light handling unit may include both a second light emitter 21 and a second light detector 22. Each light emitter or light detector may further comprise more than one light emitter or light detector.

In each embodiment of the disclosure, the first light handling unit 10 may be arranged to emit or detect light in a first frequency range, while the second light handling unit 20 is arranged to emit or detect light in a second, different frequency range. Alternatively or additionally (e.g. by providing more than one emitting or detecting functional unit at one or each light handling unit), the two light handling units may be arranged to emit or detect light in a common frequency range.

Where the first and second light handling units 10, 20 include first and second light emitters 10, 20, one or each of the first and second light handling units may further includes a respective, first or second light detector for detecting light travelling from the subject plane F3 and entering the lens unit 1, e.g. along the first axis X1. Where the first and second light handling units 10, 20 include first and second light detectors 10, 20, one or each of the first and second light handling units may further include a respective, first or second light emitter for emitting light that is projected from the lens body 1, e.g. along the first axis X1, onto the subject plane F3. In either case, either of the first and second light detectors 10, 20 may be arranged to detect light emitted by the first or second light emitter and reflected from the subject plane F3.

Referring to FIG. 8 and FIG. 9, where the respective, first or second light handling unit includes two or more functional units such as a light emitter and a light detector (or two or more light emitters or detectors), the functional units may be arranged concentrically with an outer unit 10', 20' (light emitter or light detector) surrounding an inner unit 10", 20" (light emitter or light detector) when considered in a direction along the emission axis, as shown in FIG. 9.

Irrespective of how many functional units are combined in each light handling unit, each functional unit (light emitter or light detector) may be configured as a light emitting or detecting array, or to emit or detect light along a single axis.

Figure 21:
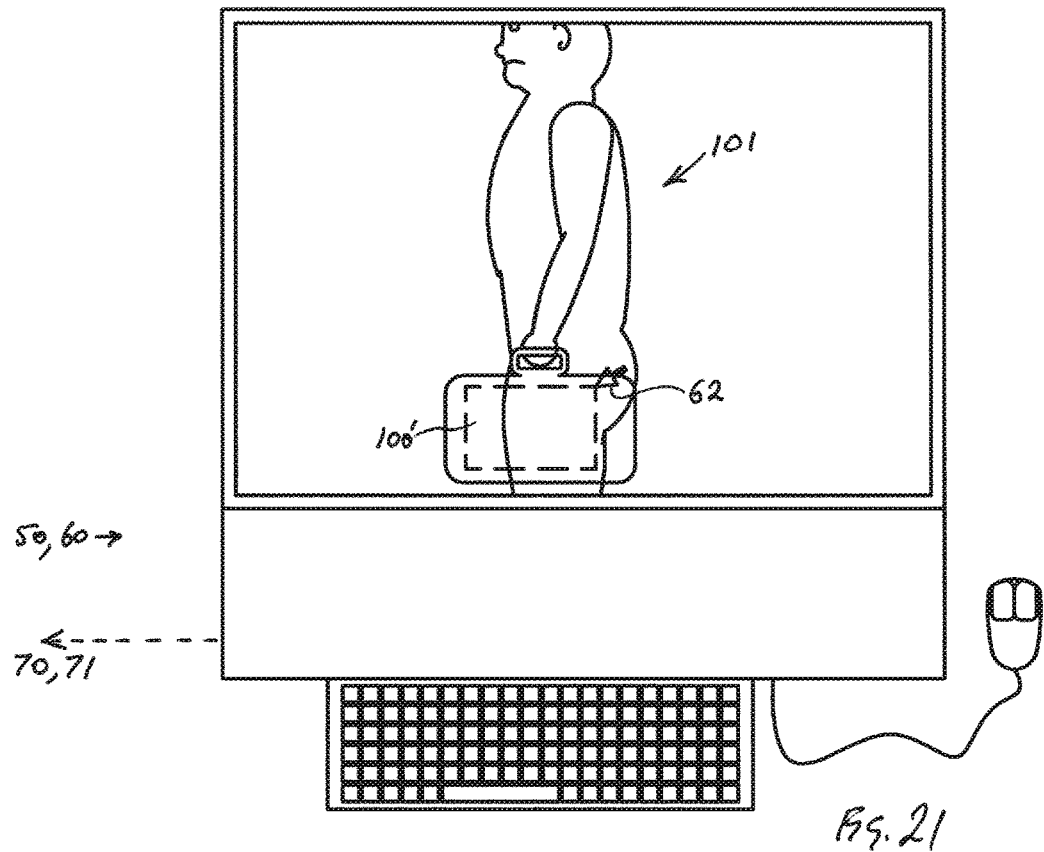
Figure 22:
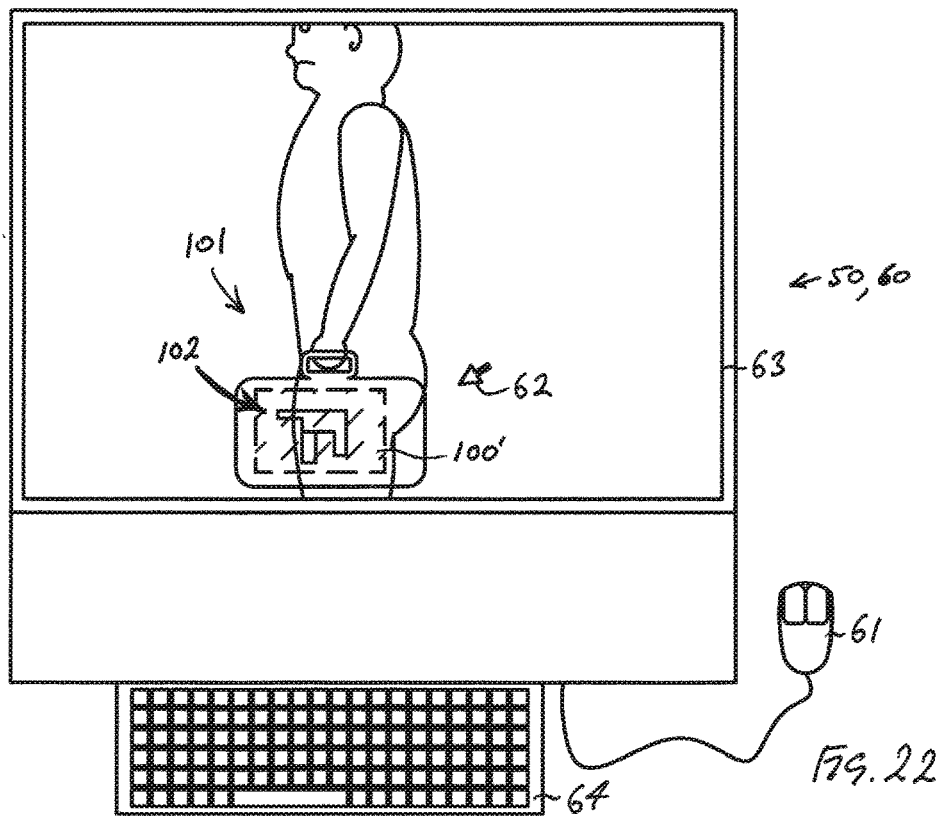

As shown in FIG. 8, the apparatus may further include a controller 50 and a user interface 60. The controller may include a processor 51 and memory 52 and may send and/or receive signals to and from the light emitter(s) and/or detector(s) of each light handling unit 10, 20 and the user interface 60. Where a beam director 70, e.g. an actuator 71 is provided for directing the light or target point over the subject plane F3, the controller 50 may also control the beam director 70 as further explained below. The user interface may include controls for issuing commands to control elements of the apparatus such as the light handing units and/or the beam director, and/or indicating means for conveying information from those elements of the apparatus to the user, and will vary according to the intended application. In some applications the user interface may include for example a display screen and/or a keyboard and/or a mouse as shown in FIGS. 21 and 22.

Referring to FIG. 10, a light emitting or detecting array 30 forming a functional unit of a respective light emitter or light detector 10, 20 comprises an array of light emitting or light detecting elements 31. If the elements 31 are light detecting elements then they may detect an image projected onto the array from the subject plane F3 to generate a signal to the controller 50 and/or user interface 60. If the elements 31 are light emitting elements then they may generate an image responsive to a signal from the controller 50 and/or user interface 60 which is projected onto the subject plane F3.

Referring to FIG. 11, each element 31 may comprise a sub-array of sub-elements 31' which are individually controllable by the signals. For example, where the array 30 is a light emitting array, the sub-elements 31' may be selectively controllable to emit light at different frequencies. For example, the sub-elements 31' might be LEDs emitting light at different frequencies. Where the array 30 is a light detecting array, the sub-elements 31' might be detectors for detecting light at different frequencies to send a signal indicating more than one image, the images being superimposed, each image representing the light emitted from the subject plane F3 at a different one of those frequencies.

Referring now to FIGS. 12-16, the apparatus may include a beam director 70 which is operable (e.g. by the controller 50 and/or responsive to user commands via the user interface 60) to rotate at least one optical element of the apparatus relative to the subject plane F3 to move at least one of the first and second portions of light L1, L2, or to move a target point T1 (FIG. 19, FIG. 20) from which at least one of the first and second portions L1, L2 of light is received, across the subject plane F3.

The at least one optical element of the apparatus may be at least one of the lens body 1, the first light handling unit 10, the second light handling unit 20, a first additional optical element interposed between the first light handling unit 10 and the lens body 1, a second additional optical element interposed between the second light handling unit 20 and the lens body 1, and a third additional optical element interposed between the lens body 1 and the subject plane F3.

The beam director 70 may include an actuator 71 for moving the lens body 1, e.g. in rotation, preferably about its central point. For this purpose the lens body 1 may be movably, e.g. rotatably mounted in any convenient manner, for example, slidably supported on a surface such as a circular or cylindrical frame, or, as illustrated, in gimbals 80 for rotation about one, two or three axes as required.

As illustrated, the reflector 4 may be arranged in fixed relation to the ball, and the beam director 70 may include an actuator 71 operable to move, preferably to rotate, the lens body 1 (including the reflector 4) relative to the subject plane F3.

Alternatively, if the reflector 4 is movable relative to the ball 2, then the beam director 70 may be operable to move the reflector 4, preferably in rotation, relative to the ball 2. In this case the arrangements illustrated in FIGS. 12-16 and discussed below may be adapted mutatis mutandis.

The beam director 70 may include a first actuator 71' for moving the light or target point to a desired region of the subject plane F3, and a second actuator 71" for scanning the light or target point rapidly over the desired region. The or each actuator may include several actuator units.

As shown in FIGS. 12, 13 and 14, the first and second light handling units 10, 20 may be arranged in fixed relation to the lens body 1, and the actuator 71 operable to rotate the lens body 1 together with the first and second light handling units 10, 20 relative to the subject plane.

Where both of the first and second light handling units 10, 20 are fixed in relation to the reflector and the lens body 1, the first axis X1 may be defined in a fixed position relative to the reflector, in which case both units 10, 20 will receive or emit light travelling along the first axis X1 in all rotational positions of the lens body 1.

In mounting configuration A1 as shown in FIG. 12, a single actuator 71 is arranged to perform both rapid scanning and scan area selection functions.

In mounting configuration A2 as illustrated in FIGS. 13 and 14, separate actuators 71', 71" are provided for those two functions.

Figure 15:
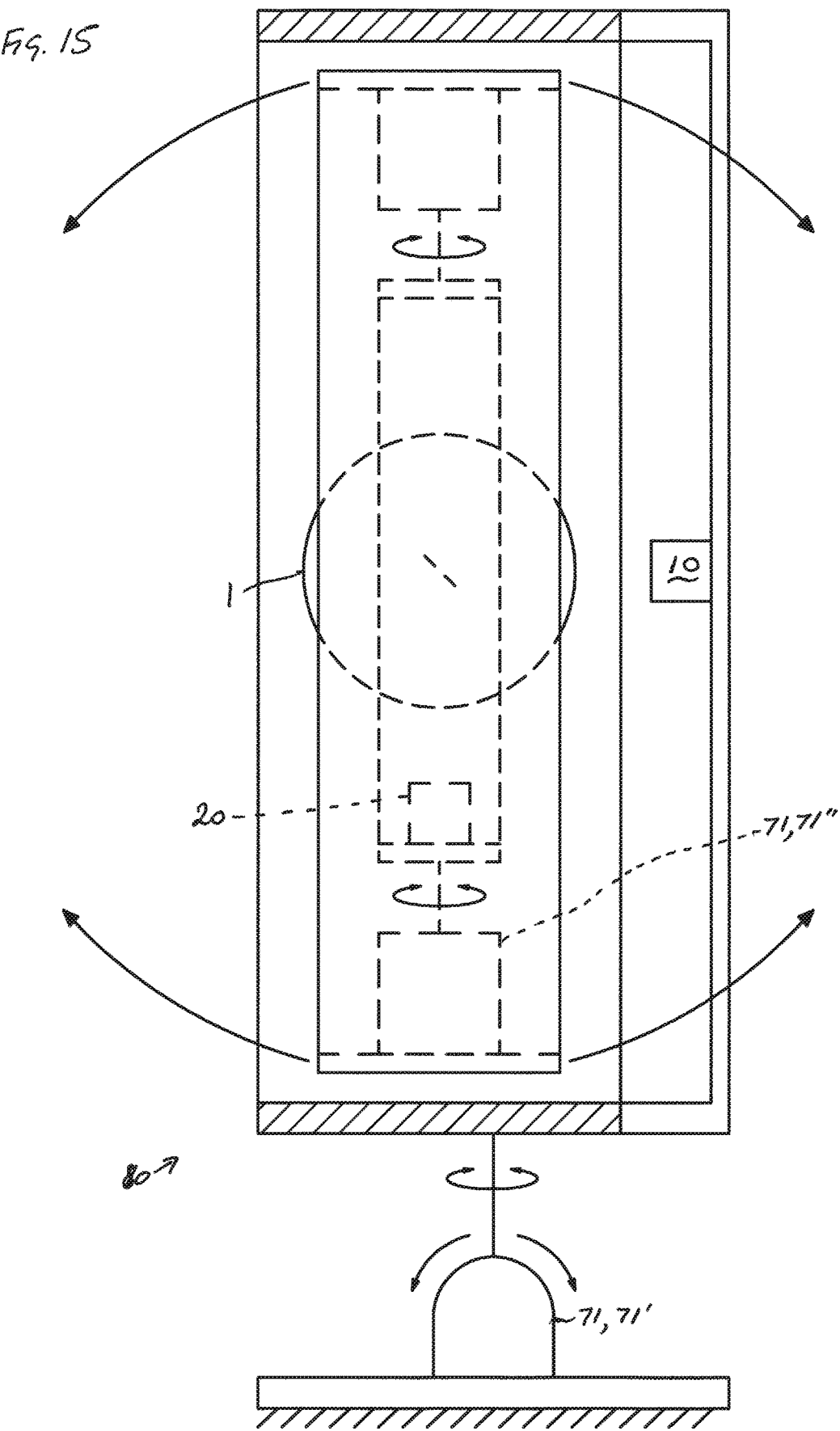
FIG. 15 illustrates another mounting configuration of the apparatus, referred to hereinafter as "mounting configuration B1", in which the second light handling unit is arranged in fixed relation to the lens body, and is rotatable together with the lens body relative to the first light handling unit.

Referring to FIG. 15, alternatively a respective one of the first and second light handling units 10, 20 may be arranged in fixed relation to the lens body 1, the actuator 71 or second actuator 71" being operable to rotate the lens body 1 together with said respective one of the first and second light handling units 10, 20 relative to the subject plane F3 and relative to the respective, other one of the first and second light handling units 10, 20. The second actuator 71" may accomplish this movement for example to scan the subject plane F3.

In such arrangements, the lens body 1 and both of the first and second light handling units 10, 20 may be movable, e.g. rotatable, relative to the subject plane F3 by the actuator 71 or first actuator 71', as illustrated in FIG. 15, so as to move the scanned region to a desired part of the subject plane F3.

Thus, motion of 1, 10 and 20 together may be accomplished independently of motion of 1 and 20 relative to 10 in mounting configuration B1, or in the alternative mounting configuration B2 discussed below, independently of motion of 1 and 10 relative to 20.

In mounting configuration B1 as shown in FIG. 15, the second light handling unit 20 is arranged in fixed relation to the lens body 1, and is rotatable by the actuator 71" together with the lens body 1 relative to the first light handling unit 20.

Alternatively, in a similar mounting configuration B2 (not shown), the first light handling unit 10 is arranged in fixed relation to the lens body 1, and is rotatable together with the lens body 1 relative to the second light handling unit 20. The apparatus may be mounted on gimbals 80 and movable by the actuator 71 in a similar arrangement to that of FIG. 15 with the gimbal frames adapted to support 10 and 20 in the required manner.

Figure 16:
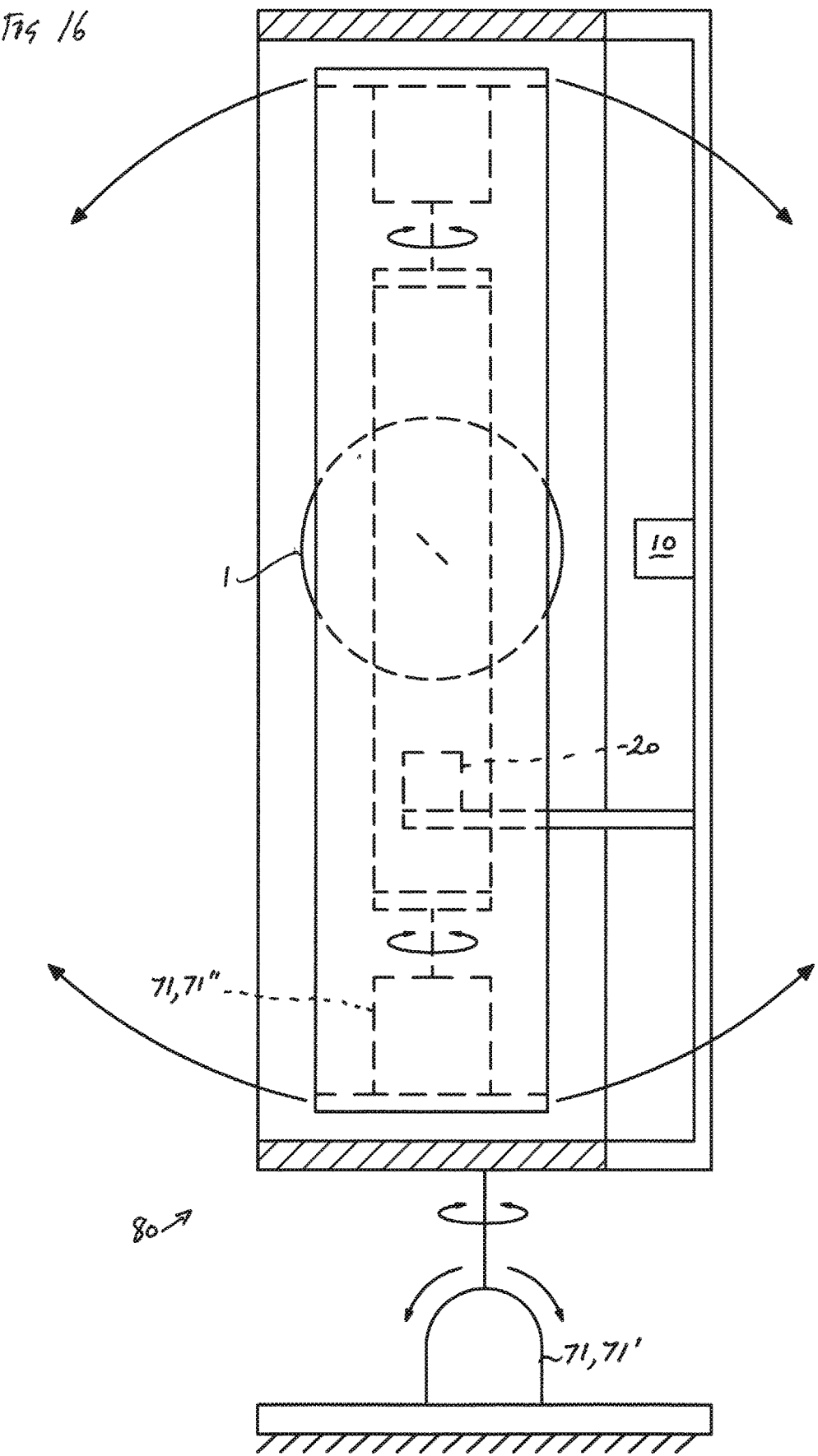
FIG. 16 illustrates another mounting configuration of the apparatus, referred to hereinafter as "mounting configuration C", in which the lens body is rotatable relative to both of the first and second light handling units.

Referring to FIG. 16, in alternative mounting configuration C the actuator 70 may be operable to rotate the lens body 1 relative to both of the first and second light handling units 10, 20. Again, a first actuator 71' and second actuator 71" may be provided respectively for aiming and scanning the beam or target point over the target surface.

It should be understood that references herein to the different mounting configurations (A1, A2, B1, B2, C) refer broadly to the relationship of movement between the first and second light handling units 10, 20 and the reflector 4 and/or lens body 1 and not to the details of the gimbals or other mechanical mounting arrangements which can be adapted by the skilled person as required.

Although specific mounting and rotation arrangements are further discussed below, it should be understood that in each of its embodiments as discussed herein, the apparatus may be mounted in accordance with any of the mounting configurations A1, A2, B1, B2, C.

In embodiments in accordance with the first aspect of the disclosure, and as illustrated by the examples of FIGS. 17 and 18, the first light handling unit 10 includes a first light emitter, and the second light handling unit 20 includes a second light emitter.

As shown in the example of FIG. 17, the first and second light emitters may include or consist of respective, first and second lasers (i.e. laser light emitters).

A respective one of the first and second light emitters may be a high powered laser, with the respective, other one of the first and second laser light emitters being a low powered laser, it being understood that the relative terms "high" and "low" mean that the high powered laser is arranged to emit laser light at a higher power than the low powered laser.

Optionally, as shown in FIG. 17, the first light emitter 10 may be the low powered laser, and the second light emitter 20 may be the high powered laser which is reflected by the reflector 4 onto the target surface at the subject plane F3.

The low powered laser may be used to indicate a target point T2 on the target surface at which the high powered laser is pointed. The high powered laser may be energized, for example, to degrade or ablate the target surface, which may be for example a region of the skin of the human body for removal of a tattoo or treatment of a skin lesion, or a remote object such as a drone in flight that is targeted for destruction.

The apparatus may further include a beam director 70, for example, an actuator 71 as discussed above, the beam director being arranged to move the light from both of the first and second laser light emitters across the subject plane.

By way of example, the reflector 4 may be arranged in fixed relation to the first and second light emitters, and the beam director may comprise an actuator 71 which is arranged to rotate the reflector and the first and second light emitters together relative to the subject plane F3, for example, responsive to a control signal from the controller 50 or responsive to user input via the user interface 60. The reflector 4 may be arranged in fixed relation to the ball 2 so that the actuator 71 can move the lens body 1 together with the first and second light emitters 10, 20.

Alternatively, the actuator 71 may be arranged to rotate the reflector 4 relative to both of the first and second light emitters 10, 20. Where the reflector 4 is arranged in fixed relation to the lens body 1, the actuator may rotate the lens body 1 relative to the first and second light emitters 10, 20.

In such embodiments, the lens body 1 may include a second reflector 4' arranged to reflect a portion L3 of the laser light emitted by the low powered laser 10 onto a detector 40 which is fixed relative to the first and second light emitters. The second reflector 4' is arranged in the lens body 1 to reflect onto the detector 40 a portion of the light L3 emitted from the low powered laser and travelling towards a rear surface of the reflector 4. The detector 40 is arranged as an array to detect the position of the portion L3 of laser light falling on the detector 40 and provide a signal to the controller 50 indicating the position of the reflector 4 relative to the subject plane F3. The signal may be processed by the controller 50 to indicate the direction of the high energy bean L2 from the high powered laser 20 or the point T2 at which it will impinge on the target surface F3, for example, as a graphic display via the user interface (e.g. a computer screen).

In yet further embodiments, a respective one of the first and second light handling units 10, 20 may further include a respective, first or second light detector (not shown) for detecting light travelling from the subject plane F3 and entering the lens body 1, and the controller 50 may be configured, responsive to receiving a user command via the user interface 60 (not shown), to energize the low powered laser 10, and then to receive a target acquired signal from the first or second light detector (not shown) indicating detection of the low powered laser at the subject plane F3, and then responsive to receiving the target acquired signal, to enable energization of the high powered laser 20 (or 10, if the positions of the low and high powered lasers are the reverse of that shown).

Referring now to FIG. 18, a respective one of the first and second light emitters may be a laser light emitter, and the respective other one of the first and second light emitters being a projector, which is to say, a light emitter adapted for projecting an image 90 onto the subject plane T3.

In the illustrated example, the second light emitter 20 is the laser light emitter, and the first light emitter 10 is the projector which displays the image 90 by means of an array 30 which generates the image at the first conjugate focal plane F1.

In such embodiments the apparatus further includes a beam director 70 (e.g. an actuator 71 as described above) and a user interface 60, the beam director 70 being arranged to move the respective portion L2 of the light emitted by the laser light emitter 20 across the subject plane F3 responsive to a user input via the user interface 60, which may display an image 90' corresponding to the projected image 90 on the subject plane, for example, by sending the same signal to the screen 63 and the array 30.

The user interface 60 may be a screen 63 with a keyboard 64 and a mouse 61 controlling a pointer 62 on the screen, which can be used to indicate the target point T2 at which the laser light L2 is to impinge on the subject plane T3.

The apparatus may be arranged to confine the respective portion L2 of the light emitted by the laser light emitter 20 (or 10) to a region of the subject plane T3 onto which the image is projected. This may be accomplished either mechanically (by mechanically limiting the motion of the movable parts of the apparatus) or electronically (for example, by limiting the range of movement that the actuator 71 can be commanded to perform).

The beam director 70 (not shown) is arranged, for example as described above with reference to any of the respective mounting configurations, to rotate the reflector 4 (or reflector and lens body 1) relative to the subject plane F3 and relative to the projector 10 (or 20, in embodiments where 10 and 20 are reversed relative to the illustrated arrangement).

The laser can be used as a laser pointer for indicating a region of a graphic displayed on a screen, and advantageously may prevent the laser pointer from being directed away from the screen towards the audience.

Referring now to FIGS. 19-22, in embodiments in accordance with the second aspect of the disclosure, the first light handling unit 10 includes a first light detector 12, and the second light handling unit 20 includes a second light detector 22.

A respective one of the first and second light detectors may be a scanning light detector for detecting light from a target point T1 on the subject plane F3.

The apparatus further includes a beam director 70 (e.g. an actuator 71) and a controller 50, optionally also a user interface 60, generally as described above.

The beam director 70 may be arranged to scan a region 100 of the subject plane F3 by moving the target point T1 across the region 100 of the subject plane F3 while directing the respective, first or second portion L1, L2 of the light received from the target point T1 to enter the lens body 1 to travel to the scanning light detector 22.

The controller 50 may be arranged to control the beam director 70 and to process a signal from the scanning light detector 22 to generate an image 100' of said region 100 of the subject plane F3.

In the illustrated embodiment, the second light detector 22 is the scanning light detector, but in alternative embodiments, the first light detector 12 could be the scanning light detector.

In such embodiments, where as illustrated the second light detector 22 is the scanning light detector, the first light detector 10 may be an array 30 of light detecting elements 31, the lens body 1 being arranged to project an image 100' from the subject plane F3 onto the array 30. The beam director 70 (e.g. actuator 71) may be arranged to rotate the reflector 4 (or lens body 1 including reflector 4) relative to the first light detector 12 so as to scan the subject plane F3.

In such embodiments, where the first or second light detector 12, 22 is the scanning light detector, the respective other one of the first and second light detectors not being the scanning light detector (e.g. the first light detector 12 as shown in the illustrated embodiment) may be an array 30 of light detecting elements, the lens body 1 being arranged to project an image 100' from the subject plane F3 onto the array, wherein the array 30 is arranged to detect light in a first frequency range, and the scanning light detector 22 is arranged to detect light in a second, different frequency range.

This may be useful for example for detecting objects using light in a frequency range such as a millimeter wave frequency range, where the sensitivity or efficiency of the millimeter wave detector may be relatively low so that a scanning detector is required, but where it is desired to provide a better quality image using another wavelength such as visible or infrared light that can be imaged on an array detector. Where the apparatus is configured as a body scanner for scanning the human body, other considerations such as privacy may require such a double imaging system so that a less intrusive image can be used to guide the more revealing, invisible millimeter wave or other scanning frequency beam to provide a more detailed view of a particular area of the body.

Optionally, the respective one of the first and second light handling units 10, 20 including the scanning light detector 22 may further includes a light emitter 21 arranged to emit light in the first frequency range. The light emitter 21 may be configured as shown as a concentric emitter around the respective detector, to emit a beam that encircles the target point T1 on the subject plane. The beam can then be detected by the other light handling unit (e.g. by detector 12 in the illustrated embodiment) to determine and, optionally, to display the position of the invisible, scanning beam.

In each case, a separate light source, for example, a millimeter wave source, may be arranged to illuminate the subject with the light (whether visible or invisible) that is detected by the scanning detector and/or the array detector.

Optionally, a display such as a screen 63 may be arranged to receive and display a first image 101 generated from a signal from the array 30 and a second image 102 generated from the signal from the scanning light detector 22, the first and second images 101, 102 being superimposed.

Where a controller 50 and a user interface 60 are provided, the controller may be arranged to receive via the user interface 60 a user input defining a region 100' of a first image 101 generated by the array 30, and to operate the beam director 70 (e.g. actuator 71) to scan the region 100 of the subject plane corresponding to the region 100' of the first image 101 defined by the user input.

In this way the user can review the first image 101 which may be a good quality image received by the array which is configured to detect visible or invisible (e.g. infrared) light, and select a region of the subject plane F3 (such as the subject's briefcase) to scan with the more penetrating frequency of light that is detected by the scanning detector 22.

The light emitter or emitters may be arranged to project separate illumination and detection light beams, which may be emitted by different light emitting elements (e.g. laser and LED) and may be chosen as required from different bands of the electromagnetic spectrum, for example, ultraviolet, visible, and/or infrared. For example, a detection beam may be emitted in one part of the spectrum (e.g. infra red) and superimposed onto an image emitted in another part of the spectrum, e.g. the visible part of the spectrum. The detection beam might be detected by the detector and used for example by projecting a pattern onto the target surface to build a 3D image of the surface or as a graticule to identify the spatial coordinates of each pixel of the image.

A light detector may comprise a simple light detector for discriminating between the presence and absence of light, and/or any other suitable means for detecting light in the visible or non-visible parts of the spectrum, which may be emitted from the subject plane and/or reflected from ambient light or from the illumination or detection light beams projected onto the subject plane.

The or each light detector may detect radiant intensity, wavelength, and/or other measurable parameters. The detector may be arranged to provide a response to the detected light, for example, to indicate the intensity of light detected in a particular wavelength. The detector might provide an indication that the detected light falling on a target surface, e.g. a human body surface or a group of growing plants, is deficient in a particular wavelength.

A light detector configured as an array may comprise a charge coupled device or digital camera system for resolving images. The detector may be configured to produce an output signal representing an image of the target surface, wherein the signal can be processed by the controller to indicate individual pixels of the image representing the light received from individual portions or pixels of the target surface. Thus, the processor may determine from the signal the distribution of light over the target surface. The digitized image from the detector may comprise a matrix of pixels, each pixel corresponding to a spatial coordinate in the observed target field, which may be mapped (e.g. by means of a data record held in the memory of the controller) to individual pixels or light emitting elements of the light emitter or emitters.

The controller may form part of a computer system including a processor, a memory, a physical user interface with a screen and keyboard, suitable software for processing signals from the or each detector and controlling the or each light emitter, and/or actuators for focusing and rotating the lens body or other adjustable optical element of the system. The processor may control the projected light responsive to signals from the detector which receives the light emitted or reflected from the target surface. For example, the processor may analyze the signal from the detector and invoke an adjustment of the direction of the beam or the wavelength or intensity of the illumination from the light emitter. For example, if the signal indicates a deficiency in a particular wavelength of light falling on the target surface, the processor might be arranged to energize the light source to emit light in the deficient portion of the spectrum, for example, to enhance the therapeutic application of natural daylight to the human body, or to promote healthy plant growth in a greenhouse.

Each light emitting element may be a single source such as an LED or may be a compound element comprising an array of primary light emitting elements, e.g. LEDs, each emitting light at a different wavelength. An example is the LZ7 7 wavelength emitter supplied by Led Engine of California, USA. The primary light emitting elements, e.g. LEDs may be individually addressable. The controller may be configured to select a desired wavelength of the emitted light by adjusting together all the primary light emitting elements of the same wavelength, e.g. to increase the output at the red end of the spectrum relative to the blue end of the spectrum. The spatial distribution of light across the target surface will be determined by the optical system and by the spatial distribution of light across the 2D array of light emitters and so can be adjusted by individually adjusting the radiant intensity (power input) of each group of primary light emitting elements forming a compound light emitting element—i.e. the power to the compound element can be adjusted to tweak up or down the output of all its primary elements. Thus, overall wavelength can be adjusted across the whole light source, and radiant intensity can be adjusted pixel by pixel. Of course, other adjustment regimes may be implemented by suitably configuring the electrical control lines (not shown) to address the LEDs individually or group by group, as required.

A waveguide or a bundle of waveguides (one for each light emitting element) may be arranged to conduct light from the light emitting array to the lens body. The waveguide or waveguide bundle may further be arranged for safety to scramble the light rays from each point light source to provide a family of non-parallel rays within a small cone angle, the rays being randomized within the beam so that the light source cannot be imaged onto the user's retina.

Due to the potential for complex mode paths in the waveguide there may not be a simplistic relationship between the nature of the light field at the emitting end of the waveguide relative to the illumination at the launch end. However, a complex spatial relationship may exist, so that the light emitting elements can still be correlated with individual, perhaps overlapping target points or pixels on the illuminated subject plane.

Laser Tracking Embodiment

In embodiments (e.g. as described above) where the light emitter is a laser light source and a detector is provided, the processor of the controller 50 may be arranged to receive a signal from the detector representing the light received from the target surface and, by said signal, to confirm or detect the alignment of the first axis X1 with the target surface. The actuator 71 may be controllable by the processor to rotate the lens body to direct the laser light onto the target surface as the target surface moves.

The processor may confirm the alignment of the first axis with the target surface, for example, by determining the presence or absence, or intensity, or wavelength, or pattern, or modulated signal, or a time delay between transmission and reflection, or any other measurable parameter, of the light received from the target surface.

The laser light may impinge on the target surface, for example, to illuminate the target surface to act as a tracking signal which can be detected as an emission from the target surface, e.g. by another moving apparatus so as to guide the other apparatus towards the target surface, or to exert an energetic effect to degrade the target surface.

Two laser light emitters may be arranged to emit the laser light at a first, higher intensity (for example, for degrading the target surface) and a second, lower intensity (for example, for tracking or illuminating the target surface).

The actuator may be arranged to rotate the light emitter with at least two degrees of freedom about a center of rotation, so that the emitted beam can be scanned over a 2-D or 3-D target surface facing the light emitter.

Optionally, the processor may be arranged to receive a signal from the detector representing the light received from the target surface and, by said signal, to track movement of the target surface relative to the light emitter. In this way, the movement of the light emitter is controlled by the processor responsive to the light received by the detector.

The projected beam of laser light may be projected as a static pattern or moved across the target surface to produce a static or moving pattern on the target surface, so that the distortion of the known pattern produced on the surface and represented by the signal from the detector represents a 3-D contour of the target surface.

The processor may be arranged to analyze the signal from the detector to obtain an image of the target surface, for example, as said 3-D contour, and to iteratively compare a first such image with subsequent such images at successive time intervals and, by said comparison, to identify a direction of movement of the target surface so as to track the movement of the target surface.

The detector may be configured as a camera, and may include, for example, as an array of detection elements angularly offset with respect to the first axis, or to be angularly moveable around the lens body with respect to the projection axis, or as an array of detection elements with the array being angularly moveable about the lens body with respect to the first axis. In each case the detector may receive light from the target surface which enters the second lens along the projection axis and along one or more detection axes, the or each detection axis being arranged to define a small angle with the projection axis. The processor may thus obtain an image of the target surface simultaneously or nearly simultaneously from multiple angles in a close array, and by iteratively obtaining and comparing the multiple images, may identify the direction of movement of the target surface.

Alternatively, the detector may be fixed in relation to the lens body so that by moving the light emitter through a small angle about a mean or nominal position of the first axis, the detector may detect light entering the lens body along the first axis to obtain said multiple images in multiple different angular positions of the lens body. By rapidly moving the lens body, the multiple images may be generated and compared to track the movement of the target surface.

Alternatively or additionally, the light source may be arranged to modulate the laser light with a signal, and the detector may be arranged to detect the signal which is analyzed by the processor (e.g. as a time interval between transmission and reflection of a defined signal element) to determine the distance from the light emitter to the target, whereby the processor may determine movement of the target surface towards or away from the light emitter.

Instead of or additionally to controlling movement responsive to the light received by the detector, a separate tracking system (for example, a radar system) may be arranged to track movement of the target surface and send a signal to the processor which controls the movement of the light emitter. In this case, the signal received from the detector serves to confirm the correct alignment of the first axis with the moving target surface, so that the emitted laser light may be selectively controlled to impinge on the target surface but not on any other surface. For example, the processor may control the light source to interrupt or reduce the intensity of the emitted laser light if the processor detects that the emitted beam ceases to be reflected from the target surface or is reflected from a surface other than the target surface.

This concludes the description of the laser tracking embodiment.

In summary, embodiments provide a light emitting or detecting apparatus comprising a catadioptric lens body including a spherical lens containing an integral reflector and defining first and second conjugate focal planes relative to a subject plane. A pair of light emitters or a pair of light detectors are arranged respectively at the first and second conjugate focal planes to detect or emit light travelling along a common axis to or from the subject plane.

The features of the various aspects and embodiments of the disclosure may be combined together in any desired combination. Further possible adaptations within the scope of the claims will be apparent to those skilled in the art.

In the claims, reference numerals and characters in parentheses are provided for ease of reference and should not be construed as limiting features.

The invention claimed is:

1. An apparatus for emitting or detecting light travelling along a first axis, including:
   a lens body, and
   first and second light handling units;
   the lens body including a ball and a reflector contained within the ball,
   the ball being transparent and having a surface, the surface defining a total surface area of the ball and having substantially spherical curvature over substantially all of the total surface area;
   wherein, when the reflector is considered as projected along the first axis onto a reflector plane, the reflector plane being a nominal plane passing centrally through the ball and normal to the first axis, the reflector occupies less than all of an area of the reflector plane bounded by the surface;
   the apparatus being arranged to define first and second conjugate focal planes relative to a subject plane,
   and to transmit light entering or leaving the lens body along the first axis and travelling between the lens body and the subject plane, such that:
   a first portion of the light travels through the ball and past the reflector between the subject plane and the first light handling unit located at the first conjugate focal plane, and
   a second portion of the light travels through the ball and is reflected from the reflector between the subject plane and the second light handling unit located at the second conjugate focal plane;
   wherein either
      (a) the first light handling unit includes a first light emitter, and the second light handling unit includes a second light emitter; or
      (b) the first light handling unit includes a first light detector, and the second light handling unit includes a second light detector.

2. An apparatus according to claim 1, wherein the first light handling unit includes a first light emitter, and the second light handling unit includes a second light emitter.

3. An apparatus according to claim 2, wherein a respective one of the first and second light emitters is a high powered laser, and the respective, other one of the first and second laser light emitters is a low powered laser, the high powered laser being arranged to emit laser light at a higher power than the low powered laser.

4. An apparatus according to claim 2, wherein a respective one of the first and second light emitters is a laser light emitter, and the respective other one of the first and second light emitters is a projector for projecting an image onto the subject plane;
and further including a beam director and a user interface, the beam director being arranged to move the respective portion of the light emitted by the laser light emitter across the subject plane responsive to a user input via the user interface.

5. An apparatus according to claim 4, wherein the apparatus is arranged to confine the respective portion of the light emitted by the laser light emitter to a region of the subject plane onto which the image is projected.

6. An apparatus according to claim 4, wherein the second light emitter is the laser light emitter, and the first light emitter is the projector; and the beam director is arranged to rotate the reflector relative to the subject plane and relative to the projector.

7. An apparatus according to claim 1, wherein the first light handling unit includes a first light detector, and the second light handling unit includes a second light detector.

8. An apparatus according to claim 7, wherein a respective one of the first and second light detectors is a scanning light detector for detecting light from a target point on the subject plane;
and further including a beam director and a controller;
the beam director being arranged to scan a region of the subject plane by moving the target point across the region of the subject plane while directing the respective, first or second portion of the light received from the target point to enter the lens body to travel to the scanning light detector;
the controller being arranged to control the beam director and to process a signal from the scanning light detector to generate an image of said region of the subject plane.

9. An apparatus according to claim 8, wherein the second light detector is the scanning light detector,
and the first light detector is an array of light detecting elements, the lens body being arranged to project an image from the subject plane onto the array;
and the beam director is arranged to rotate the reflector relative to the first light detector.

10. An apparatus according to claim 8, wherein the respective other one of the first and second light detectors not being the scanning light detector is an array of light detecting elements, the lens body being arranged to project an image from the subject plane onto the array;
and the array is arranged to detect light in a first frequency range, and the scanning light detector is arranged to detect light in a second, different frequency range.

11. An apparatus according to claim 10, wherein the respective one of the first and second light handling units including the scanning light detector further includes a light emitter arranged to emit light in the first frequency range.

12. An apparatus according to claim 10, further including a display arranged to receive and display a first image generated from a signal from the array and a second image generated from the signal from the scanning light detector, the first and second images being superimposed.

13. An apparatus according to claim 10, further including a controller and a user interface, the controller being arranged to receive via the user interface a user input defining a region of a first image generated by the array, and to operate the beam director to scan the region of the subject plane corresponding to the region of the first image defined by the user input.

14. An apparatus according to claim 1, wherein the first light handling unit is arranged to emit or detect light in a first frequency range, and the second light handling unit is arranged to emit or detect light in a second, different frequency range.

15. An apparatus according to claim 1, further including a beam director operable to rotate at least one optical element of the apparatus relative to the subject plane to move at least one of the first and second portions of light, or to move a target point from which at least one of the first and second portions of light is received, across the subject plane.

16. An apparatus according to claim 15, wherein the reflector is arranged in fixed relation to the ball, and the beam director includes an actuator operable to rotate the lens body relative to the subject plane.

17. An apparatus according to claim 16, wherein the first and second light handling units are arranged in fixed relation to the lens body, and the actuator is operable to rotate the lens body together with the first and second light handling units relative to the subject plane.

18. An apparatus according to claim 16, wherein the actuator is operable to rotate the lens body relative to the first and second light handling units.

19. An apparatus according to claim 16, wherein a respective one of the first and second light handling units is arranged in fixed relation to the lens body, and the actuator is operable to rotate the lens body together with said respective one of the first and second light handling units, relative to the subject plane and relative to the respective, other one of the first and second light handling units.

* * * * *